United States Patent [19]

Galasso et al.

[11] Patent Number: 4,550,063

[45] Date of Patent: Oct. 29, 1985

[54] SILICON NITRIDE REINFORCED NICKEL ALLOY COMPOSITE MATERIALS

[75] Inventors: Francis S. Galasso, Manchester; Richard D. Veltri, East Hartford, both of Conn.

[73] Assignee: United Technologies Corporation, Hartford, Conn.

[21] Appl. No.: 601,206

[22] Filed: Apr. 17, 1984

[51] Int. Cl.[4] ........................ C04B 35/58; B32B 15/04

[52] U.S. Cl. ........................................ 428/614; 501/97; 416/241 B

[58] Field of Search ...................... 501/97; 416/241 B; 428/614, 608, 611, 627, 680

[56] References Cited

U.S. PATENT DOCUMENTS

| | | | |
|---|---|---|---|
| 3,969,125 | 7/1976 | Komeya et al. | 501/97 |
| 4,152,488 | 5/1979 | Schilke et al. | 428/678 |
| 4,209,348 | 6/1980 | Duhl et al. | 148/3 |
| 4,264,548 | 4/1981 | Ezis | 501/97 |
| 4,443,394 | 4/1984 | Ezis | 501/97 |

FOREIGN PATENT DOCUMENTS

| | | | |
|---|---|---|---|
| 2310824 | 1/1977 | France | 416/241 B |
| WO80/080 | 1/1980 | PCT Int'l Appl. | 501/97 |

OTHER PUBLICATIONS

Layden et al., "Development of SiAlon Materials", United Technologies Research Center, Mar. 1978, No. R78-912997-27.

Brennan, J. J., "Investigate Fiber Reinforced $Si_3N_4$", United Technologies Research Center, Mar. 1976, No. R76-912081-4.

*Primary Examiner*—Mark L. Bell

*Attorney, Agent, or Firm*—Harry J. Gwinnell

[57] ABSTRACT

An erosion resistant composite material is described comprising silicon nitride rod reinforced nickel alloy, where the silicon nitride is cold pressed and sintered and substantially nonreactive with the alloy at high temperatures. The silicon nitride can either be polycrystalline or amorphous containing alumina, 15% yttria and about 2% to about 5% silica. Three to 8% alumina is used in the case of polycrystalline silicon nitride and 2% to 6% alumina is used in the case of amorphous silicon nitride.

2 Claims, 2 Drawing Figures

1

2

FIG. 1
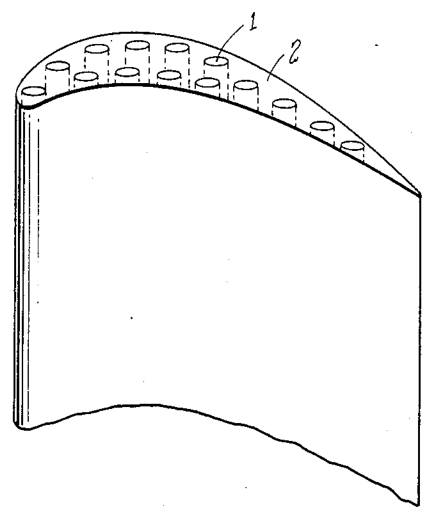
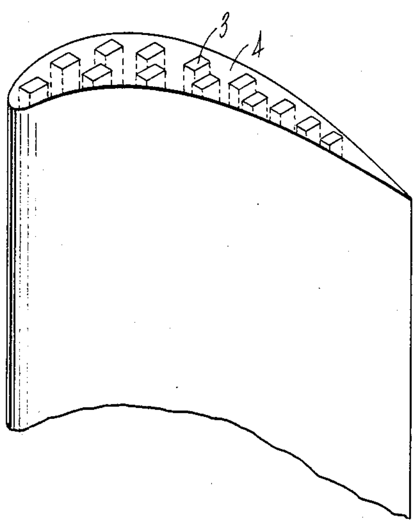
FIG. 2

SILICON NITRIDE REINFORCED NICKEL ALLOY COMPOSITE MATERIALS

CROSS-REFERENCE TO RELATED APPLICATIONS

Attention is directed to applicants' copending applications Ser. No. 132,368 filed March 21, 1980 now abandoned and Ser. No. 544,815 filed Oct. 25, 1983 now abandoned which disclose material similar to that of the present application, the disclosures of which are incorporated by reference.

DESCRIPTION

1. Technical Field

The field of art to which this invention pertains is composite materials, and specifically metal matrices reinforced with nonfree metal reinforcement.

2. Background Art

Because of the highly metal-erosive conditions present in such environments as gas turbine engines, many attempts have been made to improve the erosion resistance of nickel alloys used in this environment. This has included the use of such things as wear pads bonded to gas turbine engine blade tips. Other attempts at improving the wear resistance of nickel alloy material have included forming composite components of nickel containing ceramics. However, the development of such a successful wear resistant material has not been altogether successful, requiring such complex processes as coating of the ceramic particles to prevent reaction with the nickel alloy.

Accordingly, what is needed in this art is a method of reinforcing nickel alloy material which overcomes the problems of the prior art.

DISCLOSURE OF INVENTION

The present invention is directed to erosion resistant composite material made up of nickel alloys containing cold pressed, sintered, high density silicon nitride rod reinforcement. The silicon nitride is a cold pressed, sintered polycrystalline or partially amorphous silicon nitride containing about 15% yttria, about 2% to about 5% silica, and about 3% to about 8% alumina in the case of the polycrystalline silicon nitride, and about 2% to about 6% alumina in the case of the partially amorphous silicon nitride.

The foregoing and other features and advantages of the present invention will become more apparent from the following description and accompanying drawings.

BRIEF DESCRIPTION OF THE DRAWINGS

The Figures show typical nickel alloy reinforced articles according to the present invention.

BEST MODE FOR CARRYING OUT THE INVENTION

While any nickel alloy can be reinforced with the silicon nitride rod reinforcement according to the present invention, typically such reinforcement will be used in high strength, high temperature stable alloys such as nickel superalloys. Note, for example, commonly assigned U.S. Pat. Nos. 4,152,488 and 4,209,348, the disclosures of which are incorporated by reference. Note also IN 100 nickel superalloy.

The silicon nitride useful according to the present invention for attaining the superior properties described are primarily of two types, a polycrystalline $Si_3N_4$ and a partially amorphous $Si_3N_4$. The particular polycrystalline $Si_3N_4$ utilized in the test samples was an AME silicon nitride powder of high purity, −325 mesh, produced by Kowecki Berylco Industries. This material had a particle distribution as follows, less than 2% of the particles had a size greater than 40 microns and 50% of the particles had a particle size less than 0.7 micron. The partially amorphous silicon nitride material used in the test samples was a General Telephone and Electric (GTE) SN 402 silicon nitride. The partially amorphous silicon nitride had about 96% of the material in the alpha phase and the particles were in the 2 to 3 micron size range.

While any $Y_2O_3$ can be utilized according to the present invention the preferred yttria was formed by heating Molycorp CP grade yttrium oxalate up to 1000° C. and cooling back to room temperature over a 24 hour period. And while 15% yttrium oxide was found to give the improved properties desired, small excursions from this percentage are tolerable, e.g. 14 to 16%, with acceptable results.

The $Al_2O_3$ utilized was a Fischer CP grade material. At high nitrogen pressure sintering as little as 0.6% of this material can be used to produce the desired sintering without adversely affecting other properties such as oxidation resistance and density. At lower nitrogen pressure sintering, with polycrystalline (AME) $Si_3N_4$, 3 to 8% of the alumina produced the desired properties in the rod reinforcement, whereas when a partially amorphous $Si_3N_4$ powder such as SN 402 (GTE) $Si_3N_4$ is used, about 2% to about 6% of the alumina was all that was necessary to attain good high temperature reinforcing properties.

The material of the present invention can be processed as follows. The silicon nitride, yttria, alumina, and silica are mixed with sufficient methanol to form a paste-like consistency and ball-milled until sufficiently mixed. The powders are then dried in air at room temperature to remove the methanol. Conventional mortar and pestle mixing can also be utilized. For test purposes disk shaped articles were formed. The powders were pressed into disks approximately 0.8 inch in diameter and fired until sintered, between about 1700° C. and 2000° C. depending on nitrogen gas overpressure, and preferably at between 1700° C. to 1780° C. at atmosphere pressure. The pressure used to form the articles into the desired shape prior to sintering is merely a hand-strength die pressure, (e.g. less than 200 psi), a light pressure simply to form the material into its net shape allowing for an approximately 25% linear shrinkage during sintering. The nitrogen pressure utilized over the cold pressed articles during sintering is of two types, a low nitrogen pressure or a high nitrogen pressure. By low nitrogen pressure is meant a nitrogen pressure of about 0.5 to 2 atmospheres and by high nitrogen pressure is meant at least about 15 atmospheres and preferably 15 to 30 atmospheres. For test purposes a low nitrogen atmosphere of one atmosphere nitrogen gas pressure was used and a high nitrogen pressure of 20 atmospheres nitrogen gas pressure was used. Best results for the amorphous material was attained with an 1730° C. -1800° C. sintering temperature and one atmosphere of nitrogen gas pressure.

EXAMPLE

Small rods of polycrystalline silicon nitride 0.06 mil in diameter and 0.2 mil in length were cast in nickel superalloy. After a heat treatment at 2725° F. for 95 minutes and cooling, the edges of the rods were still well defined indicating no reaction with the nickel superalloy. This was further substantiated under optical microscope (×50) which showed no visible signs of reaction with the alloy. Similar results were observed for rectangular rods (0.05 inch thick ×0.2 inch wide ×0.1 inch long) processed and tested in similar fashion. Hot pressed silicon nitride when treated in this same manner is severely degraded.

These rods can be made to specific sizes which is a distinct advantage over, for example, hot pressed material which has to be cut to size from blocks of silicon nitride. Typically the rods (1 in FIG. 1) or bars (3 in FIG. 2) are present in the nickel alloy (2 in FIG. 1 and 4 in FIG. 2) so as to constitute about 5% to about 50% (preferably 30% to 40%) of the cross-sectional area of the composite article.

While not wanting to be limited to any particular theory it is believed that a coating of alumina and yttria forms on the bars or rods during sintering which appears to prevent reaction with the matrix material. The bars and rods can be sintered to the final shape without the machining required to form the bars and rods from hot pressed material. Also, while this invention has been described primarily in terms of rods and bars, disks, spheres, or other sinterable shapes can also be used.

Although this invention has been shown and described with respect to detailed embodiments thereof, it will be understood by those skilled in the art that various changes in form and detail thereof may be made without departing from the spirit and scope of the claimed invention.

We claim:

1. An erosion resistant composite material consisting essentially of nickel alloy reinforced with a plurality of silicon nitride rods or bars wherein the rods or bars are cold pressed, sintered, high density silicon nitride consisting essentially of, in weight percent, polycrystalline silicon nitride about 15% yttria, about 5% silica, and about 3% to about 8% alumina, wherein about 5% to about 50% of the cross-sectional area of the composite consists essentially of the cold pressed, sintered, high density silicon nitride rods or bars.

2. Erosion resistant composite material consisting essentially of nickel alloy reinfored with a plurality of silicon nitride rods or bars, wherein the rods or bars are cold pressed, sintered, high density silicon nitride consisting essentially of, in weight percent, amorphous silicon nitride about 15% yttria, about 5% silica, and about 2% to about 6% alumina, wherein about 5% to about 50% of the cross-sectional area consists essentailly of the cold pressed, sintered, high density silicon nitride rods or bars.

* * * * *